(12) United States Patent
Maloney et al.

(10) Patent No.: US 11,149,775 B2
(45) Date of Patent: Oct. 19, 2021

(54) EASILY REMOVEABLE PUSH-ON SPRING NUT

(71) Applicant: Penn Engineering & Manufacturing Corp., Danboro, PA (US)

(72) Inventors: Michael Maloney, Doylestown, PA (US); Jonathan Brunk, Philadelphia, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 215 days.

(21) Appl. No.: 16/186,787

(22) Filed: Nov. 12, 2018

(65) Prior Publication Data
US 2019/0219087 A1 Jul. 18, 2019

Related U.S. Application Data

(60) Provisional application No. 62/589,874, filed on Nov. 22, 2017.

(51) Int. Cl.
*F16B 21/07* (2006.01)
*F16B 21/06* (2006.01)
(Continued)

(52) U.S. Cl.
CPC ............ *F16B 21/076* (2013.01); *F16B 21/06* (2013.01); *F16B 21/07* (2013.01); *F16B 21/10* (2013.01);
(Continued)

(58) Field of Classification Search
CPC ........ F16B 5/0642; F16B 5/125; F16B 21/06; F16B 21/07; F16B 21/076; F16B 21/10;
(Continued)

(56) References Cited

U.S. PATENT DOCUMENTS

| 1,580,015 A | * | 4/1926 | Clark | ...................... F16B 39/24 411/131 |
| 1,755,807 A | * | 4/1930 | Boles | ...................... F16B 39/10 411/221 |

(Continued)

FOREIGN PATENT DOCUMENTS

WO 01/16499 3/2001

OTHER PUBLICATIONS

"Flat Type Washers, Flat Type Speed Nuts/Bolts Products" Website [online]. May 1, 2017. Retrieved Dec. 21, 2018. Retrieved from the Internet: URL:http://www.boltproducts.com:80/tinnerman/locking-flat.html; p. 1.

*Primary Examiner* — Roberta S Delisle
(74) *Attorney, Agent, or Firm* — Gregory J. Gore, Esq.

(57) ABSTRACT

A fastener is installed by applying an axial pressing force onto a mating component such as a round pin or a square tab. The fastener includes spring arms formed by bent tabs which deflect when pressed onto and grip the pin or other mating component between jaws of the arms making the fastener resistant to being pulled off. Downward facing fingers located around the periphery of the fastener flex when they come into contact with another portion of the mating component. This creates a residual clamp load between the fastener and the component. The fastener can easily be removed using a tool similar to snap ring pliers or needle nose pliers. Two holes on opposite sides of the fastener allow the part to be squeezed and deformed into an oval shape. This action disengages the arms and allows the fastener to slide off the mating component without resistance.

14 Claims, 3 Drawing Sheets

(51) Int. Cl.
*F16B 21/10* (2006.01)
*F16B 21/20* (2006.01)
*F16B 39/10* (2006.01)
*F16B 5/06* (2006.01)

(52) U.S. Cl.
CPC .............. *F16B 21/20* (2013.01); *F16B 39/10* (2013.01); *F16B 5/0642* (2013.01)

(58) Field of Classification Search
CPC .......... F16B 21/18; F16B 21/20; F16B 37/04; F16B 39/10; F16B 39/24; F16B 41/002; F16B 43/00; Y10S 411/918; Y10T 24/307
USPC .................. 411/517, 520, 521, 531, 533
See application file for complete search history.

(56) References Cited

U.S. PATENT DOCUMENTS

| | | | | |
|---|---|---|---|---|
| 1,911,384 A | * | 5/1933 | Olson | F16B 39/24 411/155 |
| 2,055,166 A | | 9/1936 | Berry | |
| 2,568,584 A | | 9/1951 | Hartman | |
| 2,670,226 A | * | 2/1954 | Becker | F16B 13/04 403/276 |
| 2,752,805 A | * | 7/1956 | Garman | F16B 21/20 29/278 |
| 2,950,937 A | * | 8/1960 | Bedford, Jr. | F16B 9/023 403/372 |
| 3,212,391 A | * | 10/1965 | Duffy | F16B 21/20 411/352 |
| 3,320,846 A | * | 5/1967 | Orain | F16C 35/067 411/521 |
| 3,483,789 A | * | 12/1969 | Wurzel | F16B 21/20 411/517 |
| 5,620,290 A | * | 4/1997 | Homfeldt | F16B 39/108 411/162 |
| 5,833,422 A | | 11/1998 | Haga et al. | |
| 7,712,747 B2 | * | 5/2010 | Hu | F16B 21/20 279/43.1 |
| 8,303,357 B2 | * | 11/2012 | Kuwahara | H01M 2/202 439/883 |
| 2007/0092852 A1 | * | 4/2007 | Le Bars | F16B 21/18 433/173 |

* cited by examiner

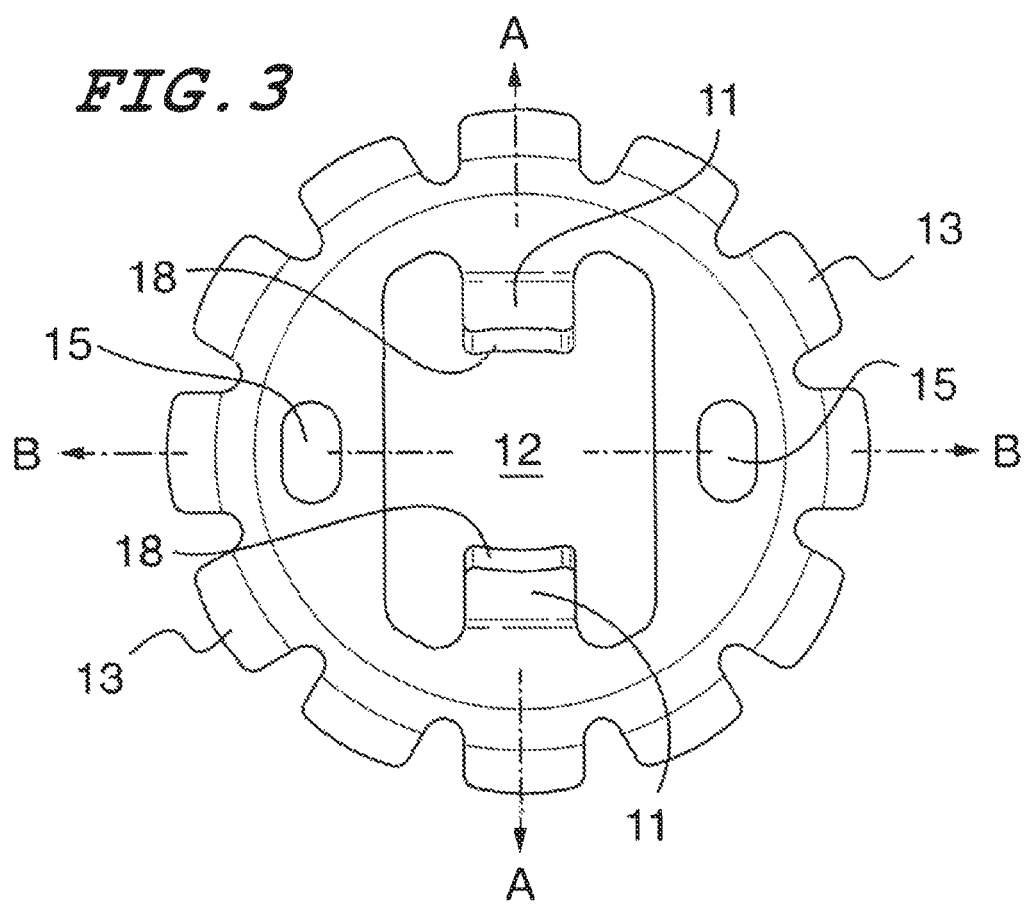
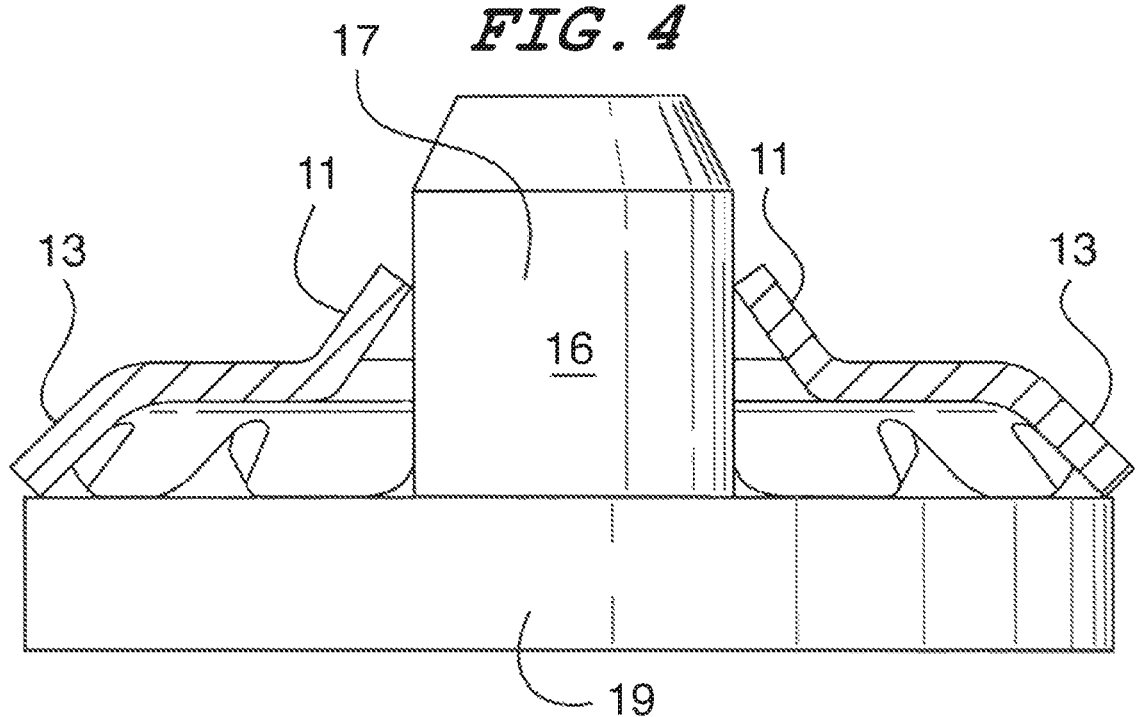

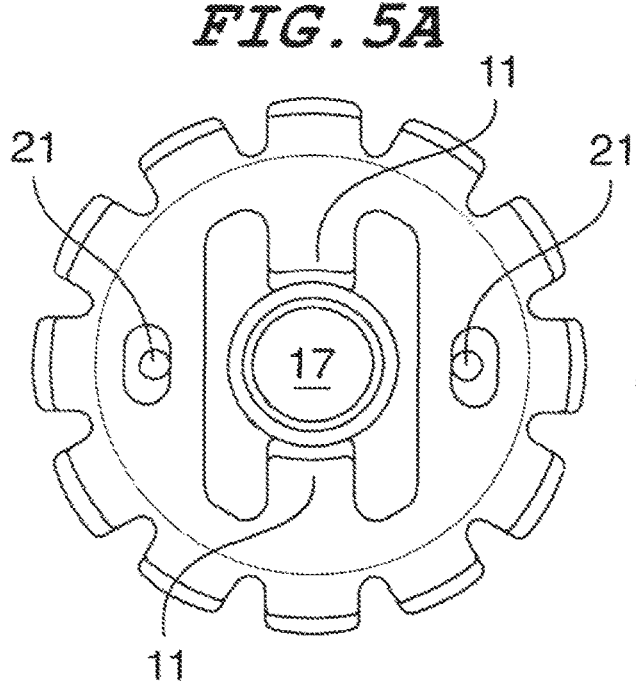
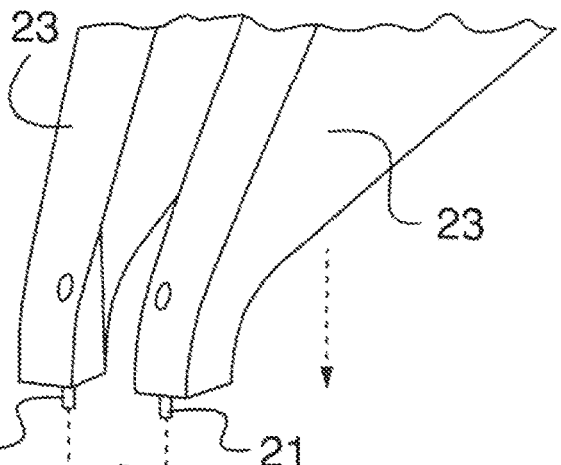
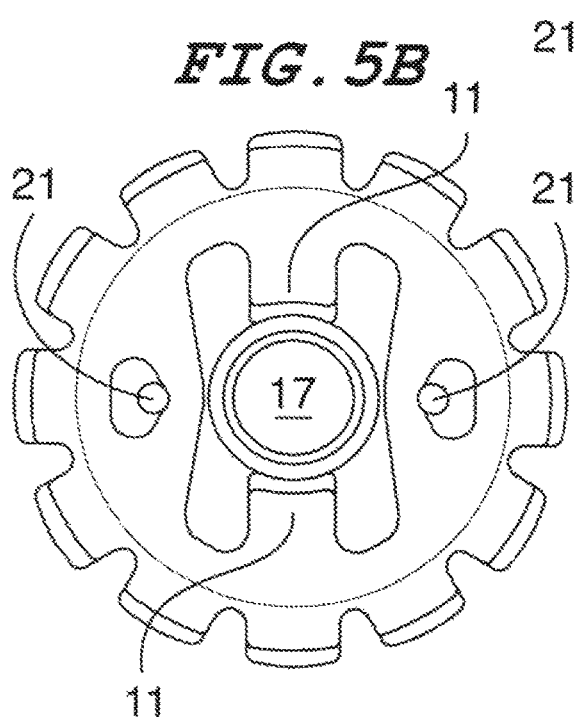
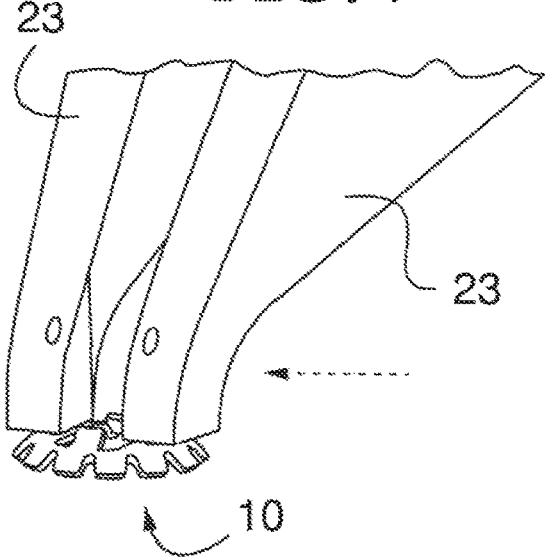

EASILY REMOVEABLE PUSH-ON SPRING NUT

RELATED APPLICATION

This is a non-provisional patent application based upon provisional application No. 62/589,874 filed Nov. 22, 2017 entitled, "Push-On Spring Nut With Removal tool", priority from which is hereby claimed.

FIELD OF THE INVENTION

The present invention relates to fasteners which receive and grip a shaft that are applied by simple axial insertion over the shaft. More specifically it relates to spring nuts of very small or micro size that can apply a residual clamp load.

BACKGROUND OF THE INVENTION

Current micro fasteners or welding techniques do not offer a good solution to fastening needs in all cases. There are three main functional aspects to most fastening systems that are generally desired: clamp load, ease of installation and removability. Currently, there are no micro fasteners that meet all three needs. Many applications require, or would benefit from, a clamp load to be generated between the two mating components. Furthermore, in the assembly operation it is useful for a simple installation motion to be employed with the simplest being an axial load applied to the fastener. This saves time and cost of installation tooling. Applying an axial load is simpler than using a threaded fastener, which relies on torque and a drive system to turn the fastener. Methods of attaching panels such as rivets and spot welding form a permanent joint but do not allow for parts to be replaced or repaired easily.

There is therefore a need in the fastening arts for a fastener which is easy to install and remove, and which provides a residual clamp load to the assembled objects. There is a further need for micro size fasteners with these characteristics.

SUMMARY OF THE INVENTION

In order to meet the needs in the fastening arts described above, a fastener has been devised which can be installed by applying an axial pressing force onto a round pin, square tab or other mating component. The fastener includes spring arms formed by bent tabs which deflect when pressed onto and grip the pin or other mating component between jaws of the arms making them resistant to being pulled off. Downward facing fingers located around the periphery of the fastener flex when they come into contact with another portion of the mating component. This creates a residual clamp load between the fastener and the component. The fastener can easily be removed using a tool similar to snap ring pliers or needle nose pliers. Two holes on opposite sides of the fastener allow the part to be squeezed and deformed into an oval shape. This action disengages the arms from the pin or mating component and allows the fastener to slide off without resistance.

More specifically, the fastener of the invention comprises a unitary body composed of resilient material, said body having a planar top with a circular periphery. A substantially rectangular opening through the center of the top has pairs of opposing short and long sides, the centerlines of which define minor and major axes of the fastener, respectively. An opposing pair of resilient arms extend upwardly and inwardly extend from the planar top. Each arm is affixed to one of the short sides of the opening along the major axis. A plurality of outwardly and downwardly extending resilient fingers are located on the periphery of the top. The top has two through-holes, each located on an opposite side of the opening adjacent its longer sides along the minor axis. The holes are adapted to receive the application of opposing inwardly directed forces whereby the fastener is distorted such that the arms spread apart. Each of the arms has an arcuate jaw at its distal end and each of the fingers is tapered radially. The entire fastener is preferably a unitary element composed of spring steel or stainless steel with the same thickness throughout.

The present fastener described above can be used in a variety of assemblies but in particular, it can be effectively used with a second member having a head and an elongate shank which extends from the head such as a pin. The fastener is located about the shank such that the arms engage the shank and thereby a residual clamp load is applied to the head. The fingers of the fastener are preferably equally spaced apart. For ease of disassembly and removal of the fastener from the pin, the top has two through-holes, each located on an opposite side of the rectangular opening through the top adjacent its longer sides along the minor axis. The inward sides of the holes are adapted to receive the application of opposing inwardly directed forces whereby the fastener is distorted such that the arms spread apart so the fastener can be lifted from the pin. The fastener can be a one-piece element composed of spring steel or stainless steel.

The ability to press the fastener into position with a single axial force simplifies assembly compared to using the threaded joint of a nut and a bolt. As opposed to other non-threaded assembly methods this fastener has the benefit of providing a clamp load between panels. The ability to easily remove the fastener is another benefit compared to typical attachment methods.

It is therefore the object of the invention to devise a fastener element which would engage the shank of a second fastener element and generate a residual clamp load after application. It is a further object of the invention to provide such a fastener element which is easy to assemble by a simple axial pressing. This is particularly needed in micro assemblies. It is yet another object of the invention to provide the ability to remove the fastener while also improving upon known fastening techniques such as riveting and welding.

These and other objects and advantages of the invention will be apparent to those of skill in the art from the following drawings and description of the preferred embodiment.

BRIEF DESCRIPTION OF THE DRAWINGS

FIG. 3 is a top plan view thereof.

FIG. 4 is a front elevation sectional view depicting the invention as installed on a pin.

FIGS. 5A and 5B are before and after top plan views showing the invention relaxed and then actuated by a removal tool.

FIGS. 6 and 7 are top right front isometric views of a tool used in the installation sequence depicted in FIGS. 5A and 5B.

DESCRIPTION OF THE PREFERRED EMBODIMENT

Figure 1:
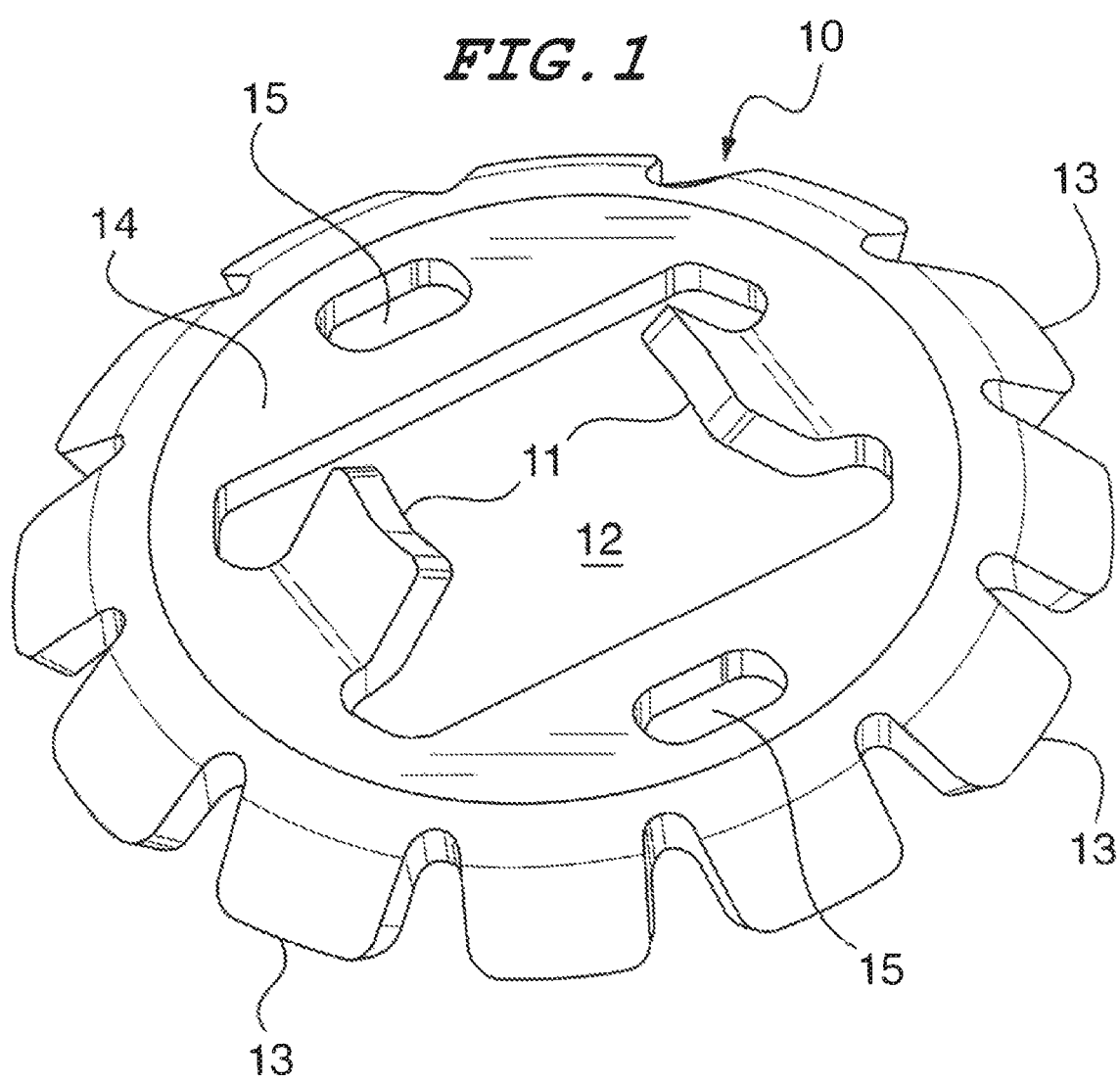
FIG. 1 is a top left front isometric view of one embodiment of the invention.

Referring now to FIG. 1, the invention is embodied in a generally circular spring nut fastener 10. The fastener has a relatively planar top 14 and a rectangular central opening 12 having pairs of opposing long and short sides, the centerlines of which define major and minor axes of the fastener, respectively as explicitly depicted in FIG. 3. The center of the fastener is defined by the intersection of the major and minor axes. A pair of integral opposing resilient tabs form spring arms 11 which extend upwardly from each of the two shorter sides of the opening 12 along the major axis. Each of the tabs may include an arcuate top end as seen here and in FIG. 3. A plurality of resilient fingers 13 extend outwardly and downwardly from the periphery of the top surface 14. The fingers 13 are tapered but can also be sharply pointed or configured in any particular way that best suits its specific application. Two vertical holes 15 pass through the top surface 14 and are located adjacent the longer sides of the central opening 12 on the minor axis. The holes are adapted for receiving the tines of a tool, which upon application of a squeezing force applied to the top surface 14 move the opposing arms 11 farther apart by deformation of the fastener.

Figure 2:
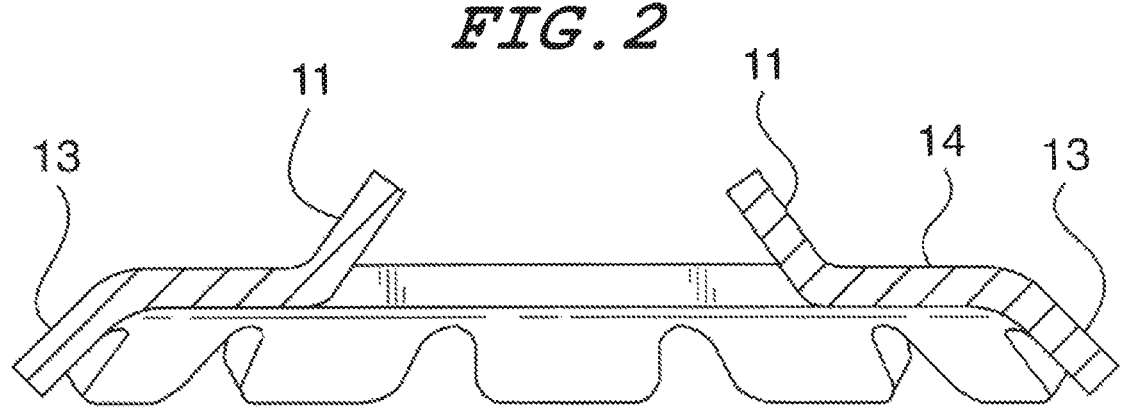
FIG. 2 is front elevation sectional view thereof.

FIG. 2 depicts a cross-section of a front view which shows the configuration of the upward facing tabs 11 that prevent the fastener from falling off or being pushed off of a mating component part such as the pin shown in FIG. 4. The arms 11 are designed such that they will be forced open by a mating component without yielding during installation. This creates a spring attachment force acting upon the mating component such as the pin shown in FIG. 4. The resultant angle of the bend of the arms 11 makes its retention to the mating component difficult to overcome because the arms 11 react with a greater grip force against pull-out forces due to their inward wedging action against the mating component. This action increases the force and static friction of the arms against the component.

Referring now to FIG. 3 another major feature of the invention are the through-holes 15 in the top surface of the fastener. The holes 15 provide a place where a tool can be inserted to apply an inward squeezing force. Lines A-A and B-B represent the major and minor axes of the fastener, respectively. The squeezing force acts towards the captured pin 17 along the minor axis B-B and distorts the shape of the entire fastener. As explained in more detail in FIGS. 5A and 5B below the fastener is thereby forced into an oval shape from its circular free state. This distortion forces the arms 11 to open from around the pin 17 allowing the fastener to disengage from the pin and to be removed upward.

In FIG. 4 we see a view of the fastener installed over a pin 17 having a head 19 and a shank 16. Here the deflection of the downward facing resilient fingers 13 creates a clamp load between the pin head 19 and the pin shank 16. The fingers 13 are compressed when the fastener is first pressed against the head 19. The fingers 13 are constructed so that they bend without yielding, hence this leaves a resultant stress in the fastener that creates downward force acting against the pin head 19. The arms 11 form gripping jaws 18 which engage the pin shank 17. The free space between the jaws 18 is appropriately selected to be less than the diameter of the pin or the width of the engaged component. The jaws 18 may have an arcuate profile to match the diameter of the pin shank to increase the contact area for greater grip. The clamp load is maintained since the fastener is prevented from moving upward in the opposite direction by the upward facing arms 11 that grip the pin shank 16 at an acute angle.

This construction of the invention seen in FIG. 4 can function like a nut and a bolt which can be used to clamp elements together between the head and the fingers of the fastener. For example a panel can be captured between the fastener and pin head 19 and other panels or materials can be added and clamped together face-to-face. The pin shank 16 shown here is smooth and unfeatured but may include other features such as circular ridges to increase the static friction characteristics of the shank. Also, the pin shank 16 may extend farther upward beyond the first fastener to engage other similar fasteners or other structures as the case may be. It will be apparent to those of skill in the art from this and the other illustrations that there are many possible uses and adaptations where the present fastener can be employed.

FIGS. 5A and 5B depict before and after conditions of the fastener when squeezed as described above. Only the tips 21 of the removal tool are shown here for clarity. As the fastener is squeezed, the holes move closer together which deforms the fastener as described above and forces the arms 11 farther apart. These conditions of the fastener correspond to the application sequence of the tool 23 seen in FIGS. 6 and 7, respectively. This deformation of the fastener moves the tabs away from the captured pin 17, releasing the retention force. Once the arms 11 are no longer in contact with the pin, the fastener is free to slide off of the pin without resistance.

FIGS. 6 and 7 depict a tool that utilizes two protruding pins 21 attached to moveable tines 23 of a tool handle (not shown). The pins fit into the through-holes of the fastener 10 to transmit a squeezing force to the inward sides of the holes as the tines are forced together as indicated by the arrows in FIG. 7. The result is the release of the fastener from the captured component as described above with regard to FIGS. 5A and 5B. The squeezing force also applies a grip on the fastener by the tool so the tool can lift the fastener from the pin. To ease insertion into the through-holes, the tool can have pointed tips to aid in alignment with the receiving holes.

At least three major features that contribute to the overall functionality of the fastener are:
1. The upward facing arms 11 that can flex and grip onto a round pin or rectangular tab inserted into the central opening.
2. The downward facing fingers 13 that provide clamp load once the fastener has been installed.
3. The vertical holes in the fastener that allow a squeezing force to be applied. This motion disengages the tabs installed over a pin for easy removal.

Materials suitable for the composition of the above described push-on nut are those which have the main properties of high tensile strength and a high yield-to-tensile-strength ratio. Examples include 301 full hard stainless steel and 1095 spring steel. The inventive nut is particularly suitable for micro assemblies where for example the nut would have a diameter of approximately 3 mm and a thickness of 0.13 mm.

From the foregoing it will be apparent to those of skill in the art that the objects of the invention have been achieved. It will also be understood that there may be many variations and adaptations that are possible without departing from the scope of the invention, which should be limited only by the claims and their legal equivalents.

The invention claimed is:

1. A unitary fastener, comprising:
   a unitary body composed of resilient material, said body having a planar top with a circular periphery;
   a substantially rectangular opening through the center of the top, said opening having pairs of opposing short and long sides, the centerlines of which define minor and major axes of the fastener, respectively;
   an opposing pair of resilient arms upwardly and inwardly extending from the top, each arm affixed to one of the short sides of the opening along the major axis; and
   a plurality of outwardly and downwardly extending resilient fingers located on the periphery of the top, and
   wherein the top has two through-holes, each located on an opposite side of the opening adjacent its longer sides along the minor axis, said holes having inward sides adapted to receive the application of an inwardly directed force whereby the fastener is distorted such that the arms spread apart.

2. The fastener of claim 1 wherein each of the arms has an arcuate jaw at its distal end.

3. The fastener of claim 2 wherein each of the fingers is tapered radially.

4. The fastener of claim 3 wherein the entire fastener is a unitary element composed of spring steel or stainless steel.

5. The fastener of claim 4 wherein the fastener has the same thickness throughout.

6. The fastener of claim 1 wherein the fingers are equally spaced about the periphery.

7. The fastener of claim 1 wherein there are only two arms.

8. An assembly, comprising:
   a first fastener member having a head and an elongate shank which extends from the head; and
   the fastener of claim 1 located about the shank such that the arms engage the shank and a residual clamp load is applied to the head.

9. The assembly of claim 8 wherein the top has two through-holes, each located on an opposite side of the opening adjacent its longer sides along the minor axis, said holes adapted to receive the application of an inwardly directed force whereby the fastener is distorted such that the arms spread apart.

10. The assembly of claim 9 wherein each of the arms has an arcuate jaw at its distal end.

11. The assembly of claim 10 wherein each of the fingers is tapered radially.

12. The assembly of claim 11 wherein the entire fastener is a unitary element composed of spring steel or stainless steel.

13. The assembly of claim 12 wherein the fastener has the same thickness throughout.

14. The assembly of claim 8 wherein the fastener is approximately 3 mm in diameter.

* * * * *